United States Patent
Bodtker et al.

(10) Patent No.: US 9,221,427 B2
(45) Date of Patent: Dec. 29, 2015

(54) SYSTEM FOR SELECTIVELY LOCKING A STEERING COLUMN

(71) Applicant: Steering Solutions IP Holding Corporation, Saginaw, MI (US)

(72) Inventors: Joen C. Bodtker, Gaines, MI (US); Kyle J. Finlan, Auburn, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 14/177,721

(22) Filed: Feb. 11, 2014

(65) Prior Publication Data

US 2015/0224961 A1  Aug. 13, 2015

(51) Int. Cl.
*B60R 25/0215* (2013.01)

(52) U.S. Cl.
CPC .................................. *B60R 25/0215* (2013.01)

(58) Field of Classification Search
CPC ..................... B60R 25/0215; B60R 25/02147; B60R 25/02134; B60R 25/0211
USPC ........................................................ 280/771
See application file for complete search history.

(56) References Cited

U.S. PATENT DOCUMENTS

| | | | | |
|---|---|---|---|---|
| 4,552,000 A * | 11/1985 | Lipschutz | ......................... | 70/185 |
| 5,896,765 A * | 4/1999 | Peyre et al. | ...................... | 70/186 |
| 6,543,262 B2 * | 4/2003 | Limburg | ........... | B60R 25/02153 70/186 |
| 7,104,097 B2 * | 9/2006 | Zillmann | ......................... | 70/186 |
| 7,870,768 B2 * | 1/2011 | Tanioka | ............ | B60R 25/02153 70/186 |
| 8,001,814 B2 * | 8/2011 | Okada et al. | ..................... | 70/186 |
| 8,424,348 B2 * | 4/2013 | Dimig | ..................... | B60R 25/00 70/182 |
| 2001/0025516 A1 * | 10/2001 | Starken | ............ | B60R 25/02153 70/186 |
| 2005/0138977 A1 * | 6/2005 | Suzuki et al. | ................... | 70/186 |
| 2005/0223761 A1 * | 10/2005 | Okuno et al. | ................... | 70/186 |
| 2010/0242665 A1 * | 9/2010 | Nagamura et al. | .............. | 74/493 |
| 2014/0069224 A1 * | 3/2014 | Dimig et al. | .................... | 74/495 |
| 2014/0150504 A1 * | 6/2014 | Town et al. | ..................... | 70/183 |
| 2014/0345337 A1 * | 11/2014 | Poggi et al. | ..................... | 70/174 |
| 2015/0068359 A1 * | 3/2015 | Sugimoto | ....................... | 74/529 |

* cited by examiner

*Primary Examiner* — Karen Beck
(74) *Attorney, Agent, or Firm* — Cantor Colburn LLP

(57) ABSTRACT

A system for selectively locking a steering column comprises a lock bolt configured for translating along its axis so as to extend, in a first state, a first length from a base and, in a second state, a second length from the base. A motor is supported by a housing and has an output shaft. A driving platform with driving ramps is disposed about the lock bolt and coupled to the output shaft. A driven platform is disposed about the lock bolt, between a shoulder of the lock bolt and the driving platform. The driven platform is configured for interacting with each of the driving ramps to define a separation distance that depends upon a rotational position of the driving platform. The driven platform is also configured to cooperate with the shoulder of the lock bolt such that translation of the driven platform causes the lock bolt to translate.

20 Claims, 4 Drawing Sheets

SYSTEM FOR SELECTIVELY LOCKING A STEERING COLUMN

BACKGROUND OF THE INVENTION

The subject invention relates to systems and methods for selectively locking a position of a steering column.

Use of electronic steering column locks (ECLs) has been expanding due to the proliferation of pushbutton start ignition across many cars and trucks. The purpose of a column lock (either electronic or mechanical) is to inhibit rotation of the steering shaft, thereby preventing steering of the vehicle. Doing so increases the difficulty of vehicle theft by pushing or towing a vehicle away while parked.

Electronic column lock modules are typically implemented by use of an electric motor to generate motion, gears for increasing torque, and a leadscrew or cam profile to convert rotation to linear motion used to extend or retract a lock bolt that blocks steering shaft rotation. An electronic controller is also included in the module to receive lock and unlock commands from the vehicle, control motor motion, and sense bolt position.

The disadvantage of the current ECL implementations is related to the use of a leadscrew or cam to generate the linear motion required to retract or extend the lock bolt. Both leadscrews and cams are friction interfaces, and therefore have an inherent inefficiency to them, leading to a requirement for upsized motor and electronics to generate the torque required to actuate the mechanism.

Accordingly, it is desirable to have an improved system and method for selectively locking a position of a steering column.

SUMMARY OF THE INVENTION

In one exemplary embodiment of the invention, a system for selectively locking a steering column comprises a lock bolt configured for translating along its axis so as to extend, in a first state, a first length from a base and, in a second state, a second length from the base. A motor is supported by a housing and has an output shaft. A driving platform with driving ramps is disposed about the lock bolt and coupled to the output shaft. A driven platform is disposed about the lock bolt, between a shoulder of the lock bolt and the driving platform. The driven platform is configured for interacting with each of the driving ramps to define a separation distance that depends upon a rotational position of the driving platform. The driven platform is also configured to cooperate with the shoulder of the lock bolt such that translation of the driven platform causes the lock bolt to translate.

The above features and advantages and other features and advantages of the invention are readily apparent from the following detailed description of the invention when taken in connection with the accompanying drawings.

BRIEF DESCRIPTION OF THE DRAWINGS

The subject matter which is regarded as the invention is particularly pointed out and distinctly claimed in the claims at the conclusion of the specification. The foregoing and advantages and details appear, by way of example only, in the following detailed description of embodiments taken in conjunction with the accompanying drawings in which:

DETAILED DESCRIPTION

Figure 1:
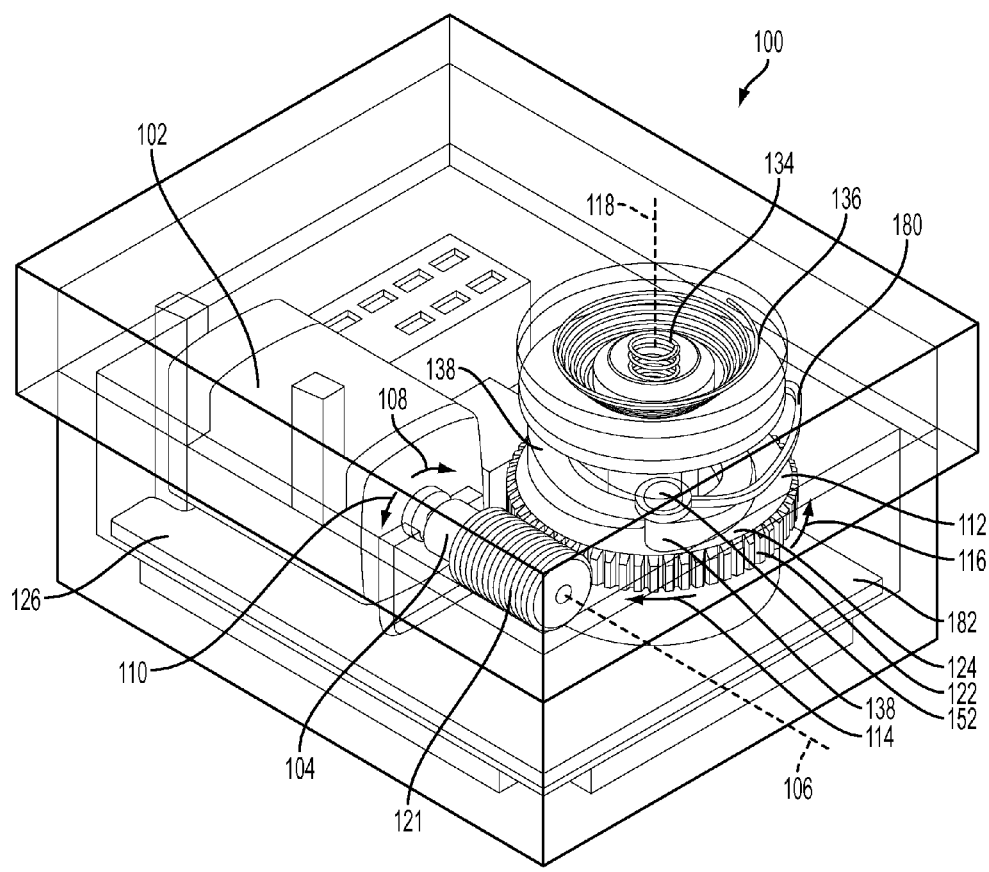
FIG. 1 is a drawing showing a perspective view of an exemplary embodiment of an electrically-actuated steering column lock assembly.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

Figure 2:
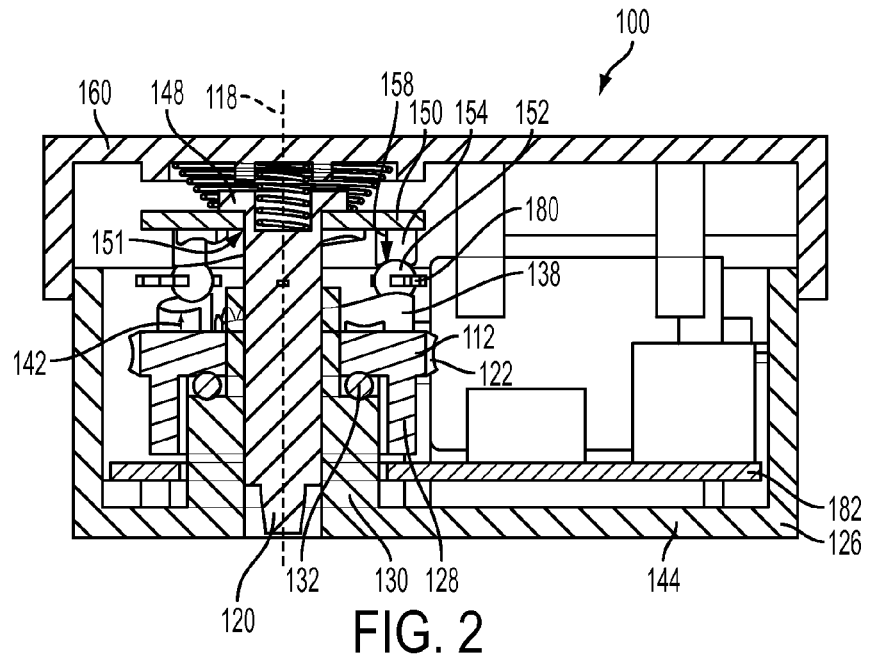
FIG. 2 is a drawing showing a side view of an exemplary embodiment of an electrically-actuated steering column lock assembly in an un-locked state.
Figure 3:
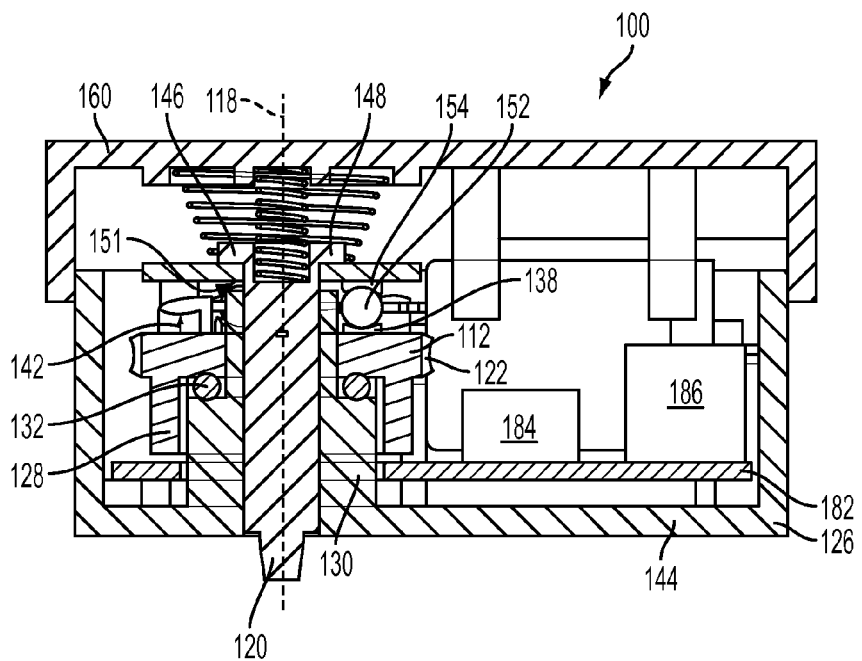
FIG. 3 is a drawing showing a side view of an exemplary embodiment of an electrically-actuated steering column lock assembly in a locked state.
Figure 4:
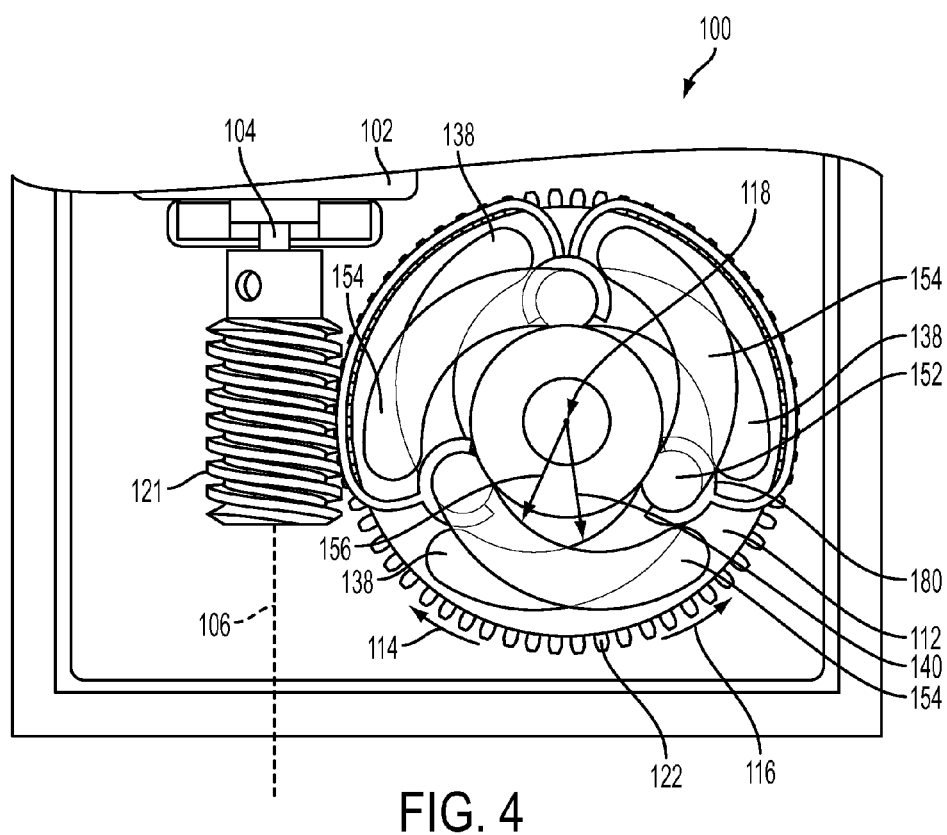
FIG. 4 top view of an exemplary embodiment of an electrically-actuated steering column lock assembly.
Figure 5:
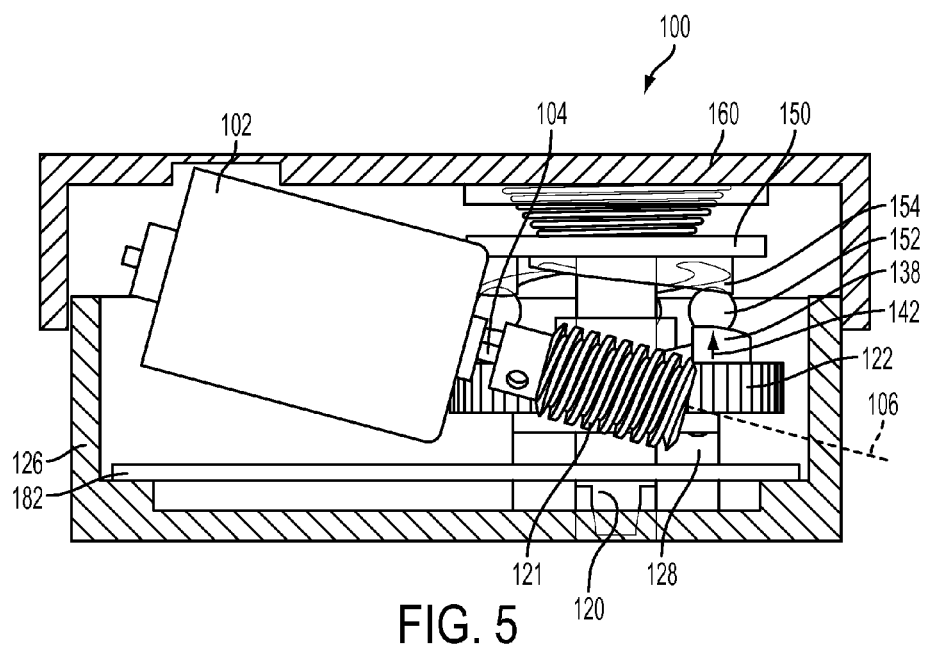
FIG. 5 is a drawing showing a side view of an exemplary embodiment of an electrically-actuated steering column lock assembly with a motor positioned in an exemplary orientation relatively to a lock bolt that is to be selectively actuated by the motor.
Figure 6:
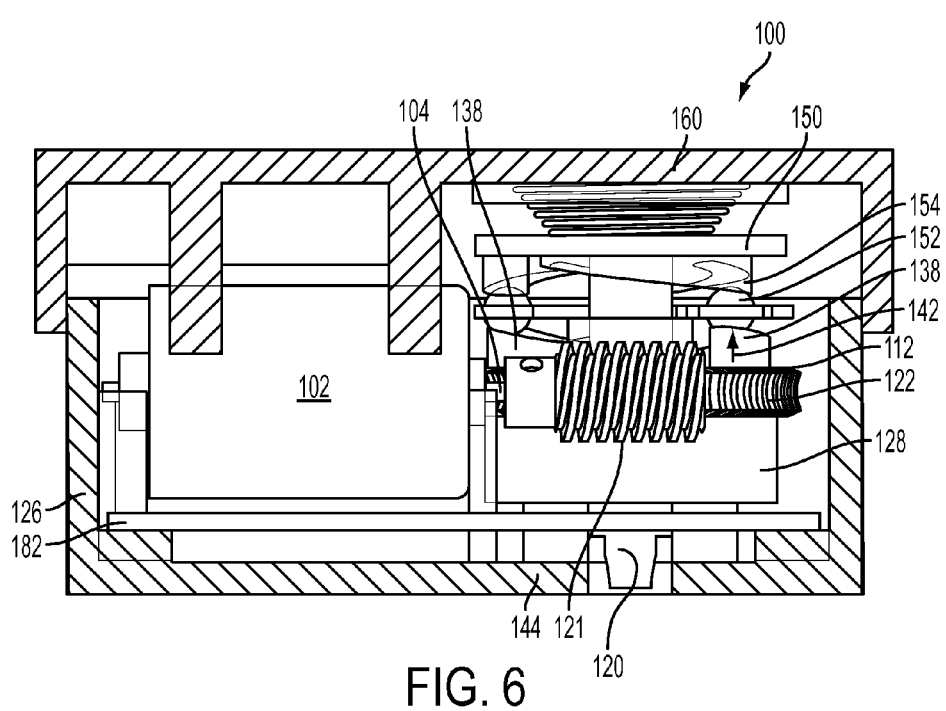
FIG. 6 is a drawing showing a side view of an exemplary embodiment of an electrically-actuated steering column lock assembly with a motor positioned in an exemplary orientation relatively to a lock bolt that is to be selectively actuated by the motor.

Referring now to the Figures, in which the invention will be described with reference to specific embodiments, without limiting same, FIG. 1 shows a perspective view of an exemplary embodiment of an electrically-actuated steering column lock assembly 100. FIGS. 2 and 3 show side views of an exemplary embodiment of an electrically-actuated steering column lock assembly 100 in an un-locked state (FIG. 2) and in a locked state (FIG. 3). FIG. 4 shows a top view of an exemplary embodiment of an electrically-actuated steering column lock assembly 100. Finally, FIGS. 5 and 6 show side views of exemplary embodiments of an electrically-actuated steering column lock assembly 100 with a motor 102, which may be a DC motor or an AC motor positioned in various orientations relatively to a lock bolt 120 that is to be selectively actuated by the motor 102.

As shown in FIGS. 1-6, in an exemplary embodiment, an electrically-actuated steering column lock assembly 100 comprises a motor 102, which may be a DC motor. It should be appreciated that motor 102 may also be an AC motor. In any event, the motor 102 is configured so as to rotate in a desired direction (e.g., in one direction or the other, depending upon the desired operation of the system). The motor 102 is electrically coupled to a source of electric current (not shown), which selectively provides an electrical potential to the motor 102 so as to motivate a motor output shaft 104 to rotate about a motor output shaft axis 106 in either a first motor direction 108 or a second motor direction 110, depending on the sense of the applied electrical potential. The motor output shaft 104 is mechanically coupled to driving platform 112 such that rotation of the motor output shaft 104 in the first motor direction 108 causes rotation of the driving platform 112 in a first platform direction 114 and such that rotation of the motor output shaft 104 in the second motor direction 110 causes rotation of the driving platform 112 in a second platform direction 116.

The driving platform 112 defines a lock bolt axis 118, along which a lock bolt 120 is disposed, and about which the driving platform 112 rotates in response to rotation of the motor output shaft 104. In an exemplary embodiment as shown in FIGS. 1-6, the motor output shaft axis 106 is disposed in a plane that is substantially parallel to the lock bolt axis 118. This plane, in which the motor output shaft axis 106 is disposed, is positioned so as to enable the motor output shaft 104 to interact mechanically with a radially outboard edge of the driving platform. For example, in one exemplary embodiment (not shown), the motor output shaft axis 106 and the lock bolt axis 118 may be disposed substantially parallel to one another. In another exemplary embodiment, as shown in FIGS. 1-3 and 6, the motor output shaft axis 106 and the lock bolt axis 118 are disposed substantially transverse to one another.

In an exemplary embodiment as shown in FIGS. 1, and 3-6, a worm 121 may be disposed on, and coupled to, the motor output shaft 104 for rotation with the motor output shaft 104, the worm 121 being disposed for engagement with teeth 122 of a worm gear 124 that is joined to the driving platform 112 so as to enable the worm 121 and the worm gear 124 to mechanically couple the motor output shaft 104 to the driving platform 112. It should be appreciated that the arrangement of the worm 121, the teeth 122 of the worm gear 124, and the relative diameters of the worm 121 and the worm gear 124 combine to determine the relative rotation of the motor output shaft 104 to the driving platform 112. For example, the worm 121, the teeth 122 of the worm gear 124, and the relative diameters of the worm 121 and the worm gear 124 may all be configured and arranged so that for every ten revolutions of the motor output shaft 104 about the motor output shaft axis 106, the driving platform 112 completes one revolution about the lock bolt axis 118. As a result, mechanical advantages may be realized, enabling the DC motor 102 to be relatively small, and the worm 121 and the worm gear 124 to comprise a relatively lightweight material such as plastic, even though the lock bolt 120 may comprise a relatively heavy material such as metal and even though a torque required to move the lock bolt 120 may be relatively large (e.g., 8:1, or 10:1, or 12:1) as compared to a torque-producing capability of the DC motor 102.

In an exemplary embodiment, the DC motor 102 is mounted on a housing 126, which is configured for being fixed to a steering column of a vehicle (not shown). The driving platform 112 is disposed for rotation relatively to the housing 126. In an exemplary embodiment, the driving platform is also disposed such that translation of the driving platform 112 relatively to the housing 126 (e.g., along the lock bolt axis 118) is limited. In an exemplary embodiment, a cylindrical skirt 128 of the driving platform and a guide platform 130 of the housing cooperate to constrain the relative movement between the driving platform 112 and the housing 126. In an exemplary embodiment as shown in FIGS. 2 and 3, a plurality of thrust bearings 132 may be disposed between the guide platform 130 and the driving platform 112 to better facilitate rotation of the driving platform 112 relatively to the housing while forces may be being exerted between the housing 126 and the driving platform 112 as the lock bolt 120 is caused to move from the locked state (FIG. 3) to the un-locked state (FIG. 2), against the urging of a bolt energizing spring 134 and/or a retention spring 136, and against whatever other mechanical resistances may be associated with movement between states. Accordingly, the plurality of rolling thrust bearings 132 may eliminate one or more sliding interfaces that would otherwise be required. In one embodiment, the thrust bearings 132 comprise plastic balls, rather than steel balls, thereby reducing noise and decreasing lubrication requirements. It should be appreciated that the driving platform 112, including the driving ramps 138, may be molded as a single piece and may comprise plastic.

As shown in FIGS. 1-3 and 5-6, in an exemplary embodiment, the driving platform comprises a plurality (e.g., two, or three, or more) of driving ramps 138, each being disposed about the lock bolt axis 118 with a continuously varying radius of separation 140 (FIG. 4) from the lock bolt axis 118 and with a continuously varying height 142 (FIG. 2) along each of the plurality of driving ramps 138. As can be best seen in FIG. 4, the circumferential direction along which each of the plurality of driving ramps 138 exhibits an increasing radius of separation 140 is consistent among the plurality of driving ramps 138, occupying a first rotational direction (e.g., clockwise as shown in FIG. 4). Put another way, each of the plurality of driving ramps 138 is helically wound about the lock bolt axis 118 with a graduating (i.e., gradually and/or continuously changing, increasing, or decreasing) radius of separation 140.

As shown in FIGS. 2-3 and 5-6, the lock bolt 120 is disposed through the driving platform 112 so as to extend through a base 144 of the housing 126 to such a sufficient extent that, when the housing is fixed to a steering column assembly, and when the electrically-actuated steering column lock assembly 100 is in a locked state (FIG. 3), the lock bolt 120 may interfere with operation (e.g., rotation) of the steering column. In addition, the lock bolt 120 also extends from the driving platform 112 in a direction away from the base 144 of the housing 126. At a distal end 146 (i.e., distal from the base 144 of the housing 126) of the lock bolt 120, the lock bolt 120 comprises a shoulder 148.

Between the shoulder 148 and the driving platform 112, a driven platform 150 is disposed for rotation about the lock bolt axis 118. The driven platform 150 is configured so as to define a hole 151 through which the lock bolt 120 passes, with a diameter of the hole 151 being smaller than a diameter of the shoulder 148. As a result, the driven platform 150 may translate along the lock bolt axis 118 away from the base 144 of the housing 126 only until the driven platform 150 contacts the shoulder 148, after which the continued translation of the driven platform 150 along the lock bolt axis 118 away from the base 144 of the housing 126 requires that the shoulder 148 and the lock bolt 120 translate with the driven platform 150.

It should be appreciated that the three or more driving ramps 138 are disposed between the driving platform 112 and the driven platform 150. In an exemplary embodiment, one or more ramp balls 152 are disposed between each of the three or more driving ramps 138 and the driven platform 150. In an exemplary embodiment, the driven platform 150 comprises a set of three or more driven ramps 154, complementary to the three or more driving ramps 138. In accordance with this embodiment, the three or more driven ramps 154 are disposed between the driven platform 150 and the three or more driving ramps 138, and the three or more driven ramps 154 are configured so as to cooperate with the three or more driving ramps 138 to cause the driven platform 150 to translate along the lock bolt axis 118 as the driving platform rotates about the lock bolt axis 118.

In an exemplary embodiment, each of the plurality of driven ramps 154 is disposed about the lock bolt axis 118 with a continuously varying radius of separation 156 (FIG. 4) from the lock bolt axis 118 and with a continuously varying height 158 (FIG. 2) along each of the plurality of driven ramps 154. As can be best seen in FIG. 4, the circumferential direction along which each of the plurality of driven ramps 154 exhibits an increasing radius of separation 156 is consistent among the plurality of driven ramps 154, occupying a second rotational direction (e.g., counter-clockwise as shown in FIG. 4) that is opposite to the first rotational direction. Similarly, each of the plurality of driven ramps 154 is also helically wound about the lock bolt axis 118 with a graduating radius of separation 156 that is equivalent in magnitude (yet opposite to) the graduating radius of separation 140 of the driving ramps 138 (i.e., in the opposite direction from the direction associated with the driving ramps 138).

Because the first rotational direction (defined by the arrangement of the plurality of driving ramps 138 of the driving platform 112) opposes the rotationally-fixed (i.e., non-rotating with respect to the lock bolt axis 118) orientation of the driven ramps 154, as defined by the arrangement of the plurality of driven ramps 154 of the driven platform 150, and because each of the one or more ramp balls 152 is disposed so as to require alignment between the positions in which the ramp balls 152 are disposed between the driving ramps 138 and the driven ramps 154, the driven platform 150 will be caused to translate along the lock bolt axis 118, thus lifting the lock bolt 120 out of engagement with the steering shaft (not shown) or facilitating movement of the lock bolt 120 into engagement with the steering shaft (not shown).

Thus, in an exemplary embodiment, the driving platform 112 rotates about the lock bolt axis 118, in response to the action of the motor output shaft 104, but is constrained so as to occupy a fixed position (i.e., plane) along the lock bolt axis 118. Contrariwise, the driven platform 150 (along with the driven ramps 154 disposed on the driven platform 150) is constrained so as to be rotationally fixed about the lock bolt axis 118 (i.e., prevented from rotating about the lock bolt axis 118 relatively to the housing 126), while the driven platform 150 (along with the driven ramps 154 disposed on the driven platform 150) is also constrained so as to translate along the lock bolt axis 118 in response to the rotation of the driving platform 112. In an exemplary embodiment, the driving ramps 130 and the driven ramps 154 are counter-wound helices of equivalent, yet oppositely varying radii. The ramp balls 152 interposed between the driving ramps 130 and the driven ramps 154, therefore, facilitate the conversion of the rotary motion of the driving platform 112 to a translational (i.e., lifting/lowering) motion of the driven platform 150.

In order to urge the lock bolt 120 toward a locking state, a bolt energizing spring 134 is disposed between the shoulder 148 and a cap 160 of the housing 126. In order to urge the driven platform 150 toward the driving platform 112, a retention spring 136 is disposed between the driven platform 150 and the cap 160 of the housing 126. It should be appreciated that the retention spring 136 helps to ensure that the ramp balls 152 remain in contact with their adjacent surfaces so as to better ensure that the ramp balls 152 are retained even if the lock bolt 120 were to fail to translate from an unlocked state toward a locked state as the driving platform 112 and the driven platform 150 rotate relatively to one another and the distance between the driving platform 112 and the driven platform 150 (as defined by the heights of the ramps at their points of interaction, e.g., through the ramp balls 152).

It should be appreciated that a primary purpose of the bolt energizing spring 134 is to energize the lock bolt 120, urging it to extend further out of the housing and toward a locked state in which the lock bolt 120 may be engaged with the steering shaft (not shown) so as to inhibit rotation of the steering shaft (not shown) and control of the vehicle. A primary purpose of the retention spring 136 is to maintain engagement between the ramp balls and their adjacent surfaces (e.g., the surfaces of the driving ramps 138 and the driven ramps 154). The use of both a bolt energizing spring 134 and an independent retention spring 136 enables the driven platform to retract toward the base of the housing independently of the lock bolt 120 in situations where the lock bolt 120 cannot engage a lock slot of the steering shaft (not shown) due, for example, to misalignment. To allow for a compact packaging, the retention spring 136 may be conical, allowing it to compress to a relatively flat configuration when fully compressed. In an exemplary embodiment, the bolt energizing spring 134 may be seated into a pocket on the shoulder of the lock bolt 120. Both the bolt energizing spring 134 and the retention spring 136 are disposed so as to react against the housing.

It should be appreciated that each of the surfaces of the driving ramps 138 and the driven ramps 154 may be configured so as to define a groove within which the ramp balls are constrained to roll. In one embodiment, the surfaces of the ramps are configured so that each ball contacts the surface along at least two lines as the ball rolls along the ramp. Thus, as the worm gear is rotated, the driving ramp causes the ball to climb up the driven ramp while the ball is held in position by the intersecting angles of the driving and driven ramps 154. As the balls climb the driving ramps 138, the driven platform is driven further from the base of the housing, pressing against the shoulder of the lock bolt 120 and causing the lock bolt 120 to be drawn into (and to extend less from) the housing. The number of driving ramps 138 and driven ramps 154 used in the system 100 is dictated by packaging space and contact stress requirements. The ramp balls may be retained within a cage 180 of desired for ease of assembly. For example, such a cage may comprise a plurality of flexible arms extending between each pair of ramp balls from outside the driving and driven ramps 154 so as to allow the balls to follow the helically disposed ramps as the system is actuated. Alternatively, a larger ball size could be used to allow for a rigid ball cage to retain the balls.

A controller circuit card 182 may also be disposed within the housing and operatively coupled to the motor 102 for controlling operation of the system 100. The controller circuit card 182 may comprise a processor 184 coupled to a memory storage device 186 containing instructions (e.g., software) for execution by the processor in response to one or more input signals received by the controller circuit card 182. Exemplary input signals may include signals from a vehicle body controller or other vehicle system or vehicle network and may be indicative of a desire for the system 100 to occupy a locked state or an un-locked state, of battery voltage, of actuator position, or other discrete signals from the vehicle. Connection to the vehicle's electrical system may be provided by an integral connector, or with a harness soldered to the controller circuit card and extending out of the housing.

Exemplary input signals may be indicative of current positions of the system components relative to the locked state or the un-locked state. For example, in embodiments where rotational positions of the driving platform relative to the housing may be correlated to the extent to which the lock bolt 120 extends from the housing (i.e., the extent to which the system may be approaching the physical limits of its range of motion), feedback from one or more position sensors (e.g., Hall effect sensors) may be transmitted to and received by the controller circuit card so that the processor 184, in conjunction with the signals indicating which state the system 100 is to occupy, so as to determine whether, and in what direction, and to what extent, to cause the motor output shaft to rotate. Based on its execution of the instructions, in consideration of the signals it receives, the processor 184 may then cause the controller circuit card 182 to deliver a corresponding DC voltage to the motor 102 so as to effectuate the desired control over the system 100. Accordingly the controller circuit card 182 is configured to control power to the motor 102 based upon inputs it receives.

In an exemplary embodiment, the controller circuit card may be mounted adjacent to the base of the housing, and exemplary Hall effect sensors (not shown) may be soldered to the controller circuit card 182, with a magnet (not shown) being pressed into the worm gear. Alternatively, mechanical switches may be attached to the controller circuit card 182 and disposed for reacting against features on the worm gear as it rotates relatively to the controller circuit card 182.

As shown in FIG. 5, the intersection angle of the worm and worm gear to that of the helix angle of the worm thread may be configured so as to facilitate decreasing the dimensions of the housing. In accordance with this embodiment, the mesh point may be positioned more closely proximate the base of the housing and enabling the worm gear to be configured according to a spur gear design, which may be easier to manufacture.

As a result, an improved system and method for selectively locking a position of a steering column is provided with increased efficiency for converting rotary motion of the motor 102 to linear motion of the lock bolt 120. The interposition of the ramp balls 152 between the driving platform 112 (e.g., the driving ramps 138) and the driven platform 150 (e.g., the driven ramps 154) provides for improved efficiency as the rotary motion of the motor 102 is converted to linear motion of the lock bolt 120. As a result of the mechanical efficiencies gained by use of the rolling element technology described in this invention, lower-cost electronic components with a reduced current rating may be used in the motor control and power filtering section of the electronic design.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it should be appreciated that aspects of the invention may include only some of the described embodiments. Accordingly, the invention is not to be seen as being limited by the foregoing description.

Having thus described the invention, it is claimed:

1. A system for selectively locking a steering column comprising:
    a housing having a base;
    a lock bolt concentrically disposed about a lock bolt axis and configured for translating along the lock bolt axis so as to extend, in a first state, a first extended length outwardly from the base of the housing and so as to extend, in a second state, a second extended length outwardly from the base of the housing, the first extended length being greater than the second extended length, the lock bolt comprising a shoulder at a location on the lock bolt that is distal from the base of the housing;
    a motor supported by the housing, the motor having an output shaft that is disposed about a motor output shaft axis and that is configured for rotating about the motor output shaft axis;
    a driving platform disposed about the lock bolt axis and supported relative to the base, the driving platform being mechanically coupled to the motor output shaft and configured for rotating about the lock bolt axis as the motor output shaft rotates about the motor output shaft axis;
    a driven platform disposed about the lock bolt axis and axially between the shoulder and the driving platform with respect to the lock bolt axis;
    a plurality of driving ramps disposed on the driving platform and fixed to the driving platform for rotation about the lock bolt axis with the driving platform, each of the plurality of driving ramps defining a bearing surface that is disposed along a range of ramp heights between the driving platform and the driven platform;
    the driven platform configured for interacting, directly or indirectly, with each of the driving ramps so as to define a platform separation distance that depends upon a rotational position of the driving platform; and
    the driven platform being further configured to cooperate with the shoulder of the lock bolt such that translation of the driven platform along the lock bolt axis away from the base of the housing causes the lock bolt to translate with the driven platform.

2. The system of claim 1, wherein the motor output shaft axis and the lock bolt axis are disposed substantially parallel to one another.

3. The system of claim 1, wherein the motor output shaft axis and the lock bolt axis are disposed substantially transverse to one another.

4. The system of claim 1, wherein the motor output shaft is mechanically coupled to driving platform such that rotation of the motor output shaft in the first motor direction causes rotation of the driving platform in a first platform direction and such that rotation of the motor output shaft in the second motor direction causes rotation of the driving platform in a second platform direction.

5. The system of claim 4, wherein a worm is disposed on, and coupled to, the motor output shaft for rotation with the motor output shaft, the worm being disposed for engagement with teeth of a worm gear that is joined to the driving platform such that the worm and the worm gear mechanically couple the motor output shaft to the driving platform.

6. The system of claim 1, wherein the driving platform is disposed such that translation of the driving platform along the lock bolt axis is substantially prevented.

7. The system of claim 6, wherein a cylindrical skirt of the driving platform and a guide platform of the housing cooperate to constrain the relative movement between the driving platform and the housing.

8. The system of claim 7, further comprising a plurality of thrust bearings disposed between the guide platform and the driving platform.

9. The system of claim 1, wherein the driven platform is configured for interacting with the bearing surface of each of the driving ramps through a bearing disposed between the driven platform and each of the driving ramps.

10. A system for selectively locking a steering column comprising:
    a lock bolt disposed about a lock bolt axis and configured for translating along the lock bolt axis so as to extend, in a first state, a first extended length outwardly from the base of the housing and so as to extend, in a second state, a second extended length outwardly from the base of the housing, the first extended length being greater than the second extended length, the lock bolt comprising a shoulder at a location on the lock bolt that is distal from the base of the housing;
    a motor supported by the housing, the motor having an output shaft that is disposed about a motor output shaft axis and that is configured for rotating about the motor output shaft axis;

a driving platform disposed about the lock bolt axis and supported relative to the base, the driving platform being mechanically coupled to the motor output shaft and configured for rotating about the lock bolt axis as the motor output shaft rotates about the motor output shaft axis;
a driven platform disposed about the lock bolt axis, between the shoulder and the driving platform;
a plurality of driving ramps disposed on the driving platform and fixed to the driving platform for rotation about the lock bolt axis with the driving platform, each of the plurality of driving ramps defining a bearing surface that is disposed along a range of ramp heights between the driving platform and the driven platform;
the driven platform configured for interacting, directly or indirectly, with each of the driving ramps so as to define a platform separation distance that depends upon a rotational position of the driving platform;
the driven platform being further configured to cooperate with the shoulder of the lock bolt such that translation of the driven platform along the lock bolt axis away from the base of the housing causes the lock bolt to translate with the driven platform;
wherein the driven platform is configured for interacting with the bearing surface of each of the driving ramps through a bearing disposed between the driven platform and each of the driving ramps; and
wherein the driven platform defines a hole through which the lock bolt passes, with a diameter of the hole being smaller than a diameter of the shoulder such that when the driven platform contacts the shoulder, translation of the driven platform along the lock bolt axis away from the base of the housing causes the lock bolt to translate with the driven platform.

11. A system for selectively locking a steering column comprising:
a housing having a base;
a lock bolt disposed about a lock bolt axis and configured for translating along the lock bolt axis so as to extend, in a first state, a first extended length outwardly from the base of the housing and so as to extend, in a second state, a second extended length outwardly from the base of the housing, the first extended length being greater than the second extended length, the lock bolt comprising a shoulder at a location on the lock bolt that is distal from the base of the housing;
a motor supported by the housing, the motor having an output shaft that is disposed about a motor output shaft axis and that is configured for rotating about the motor output shaft axis;
a driving platform disposed about the lock bolt axis and supported relative to the base, the driving platform being mechanically coupled to the motor output shaft and configured for rotating about the lock bolt axis as the motor output shaft rotates about the motor output shaft axis;
a driven platform disposed about the lock bolt axis, between the shoulder and the driving platform;
a plurality of driving ramps disposed on the driving platform and fixed to the driving platform for rotation about the lock bolt axis with the driving platform, each of the plurality of driving ramps defining a bearing surface that is disposed along a range of ramp heights between the driving platform and the driven platform;
the driven platform configured for interacting, directly or indirectly, with each of the driving ramps so as to define a platform separation distance that depends upon a rotational position of the driving platform;
the driven platform being further configured to cooperate with the shoulder of the lock bolt such that translation of the driven platform along the lock bolt axis away from the base of the housing causes the lock bolt to translate with the driven platform; and
wherein the driven platform is configured for rotating about the lock bolt axis.

12. A system for selectively locking a steering column comprising:
a housing having a base;
a lock bolt disposed about a lock bolt axis and configured for translating along the lock bolt axis so as to extend, in a first state, a first extended length outwardly from the base of the housing and so as to extend, in a second state, a second extended length outwardly from the base of the housing, the first extended length being greater than the second extended length the lock bolt comprising a shoulder at a location on the lock bolt that is distal from the base of the housing;
a motor supported by the housing, the motor having an output shaft that is disposed about a motor output shaft axis and that is configured for rotating about the motor output shaft axis;
a driving platform disposed about the lock bolt axis and supported relative to the base, the driving platform being mechanically coupled to the motor output shaft and configured for rotating about the lock bolt axis as the motor output shaft rotates about the motor output shaft axis;
a driven platform disposed about the lock bolt axis, between the shoulder and the driving platform;
a plurality of driving ramps disposed on the driving platform and fixed to the driving platform for rotation about the lock bolt axis with the driving platform, each of the plurality of driving ramps defining a bearing surface that is disposed along a range of ramp heights between the driving platform and the driven platform;
the driven platform configured for interacting, directly or indirectly, with each of the driving ramps so as to define a platform separation distance that depends upon a rotational position of the driving platform;
the driven platform being further configured to cooperate with the shoulder of the lock bolt such that translation of the driven platform along the lock bolt axis away from the base of the housing causes the lock bolt to translate with the driven platform; and
wherein one or more ramp balls is disposed between each of the three or more driving ramps and the driven platform and the driven platform comprises a set of driven ramps complementary to the three or more driving ramps, the three or more driven ramps being disposed between the driven platform and the three or more driving ramps, and the three or more driven ramps being configured so as to cooperate with the three or more driving ramps to cause the driven platform to translate along the lock bolt axis as the driving platform rotates about the lock bolt axis.

13. The system of claim 12, wherein each of the three or more driving ramps is helically wound about the lock bolt axis with a graduating radius of separation and with a continuously varying height along each of the three or more driving ramps.

14. The system of claim 13, wherein each of the three or more driven ramps being helically wound about the lock bolt axis with a graduating radius of separation that is equivalent in magnitude, yet opposite, to the graduating radius of separation of the driving ramps such that the driven platform is caused to rotate about the lock bolt axis in a direction that is opposite to the direction in which the driving platform rotates about the lock bolt axis.

15. The system of claim 1, wherein further comprising a bolt energizing spring that is disposed between the shoulder and a cap of the housing so as to urge the lock bolt toward the locking state.

16. The system of claim 15, wherein the bolt energizing spring is seated into a pocket on the shoulder of the lock bolt.

17. The system of claim 1, wherein further comprising a retention spring that is disposed between the driven platform and the cap of the housing so as to urge the driven platform toward the driving platform.

18. The system of claim 1, wherein the motor is electrically coupled to a controlled source of electrical power, the controlled source of power being configured for providing electric power to the motor according to a controlled power characteristic, the motor configured for causing the output shaft to rotate about a motor output shaft axis in either a first motor direction or a second motor direction in response to the controlled power characteristic.

19. The system of claim 18, wherein further comprising a controller circuit card disposed within the housing and operatively coupled to the controlled source of electrical power, the controller circuit card comprising a processor coupled to a memory storage device containing instructions for execution by the processor in response to one or more input signals received by the controller circuit card, the processor configured to cause the controller circuit card to deliver a desired voltage to the motor so as to effectuate the desired control over the position of the driving platform.

20. The system of claim 19, wherein the input signals including signals indicative of a rotational position of the driving platform or of a linear position of the lock bolt along the lock bolt axis.

* * * * *